April 26, 1966     R. G. GIRARD     3,247,826

FILTERING MEANS FOR AN AQUARIUM

Filed July 10, 1964

INVENTOR.
RAYMOND G. GIRARD
BY
*Barlow & Barlow*
ATTORNEYS

3,247,826
FILTERING MEANS FOR AN AQUARIUM
Raymond G. Girard, 224 Ashley Blvd.,
New Bedford, Mass.
Filed July 10, 1964, Ser. No. 381,801
4 Claims. (Cl. 119—5)

This invention relates to an aquarium and more particularly to a filter means for an aquarium.

Some sort of filtering means is usually present in connection with an aquarium in order that the water may be purified and kept clean and usually such a filter picks up water from a part of the aquarium and after filtering it discharges it to substantially the same part of the aquarium, all in a more localized area.

One of the objects of this invention is to provide an arrangement so that water will be picked up from all areas of the aquarium and transmitted to a filter for filtration, thus there is not the probability of some area of the aquarium getting a different filtering action than other portions of the aquarium.

Another object of the invention is to maintain the gravel bed of the aquarium clean by transferring the water to the filter from above the gravel bed rather than through the gravel bed to the filter.

Another object of the invention is to provide a simple filter which may be conveniently positioned below the liquid level of the water in the aquarium and partly concealed in sand at the bottom thereof with pick-up branches spread over a large portion of the aquarium.

With these and other objects in view, the invention consists of certain novel features of construction as will be more fully described and particularly pointed out in the appended claims.

Figure 1:
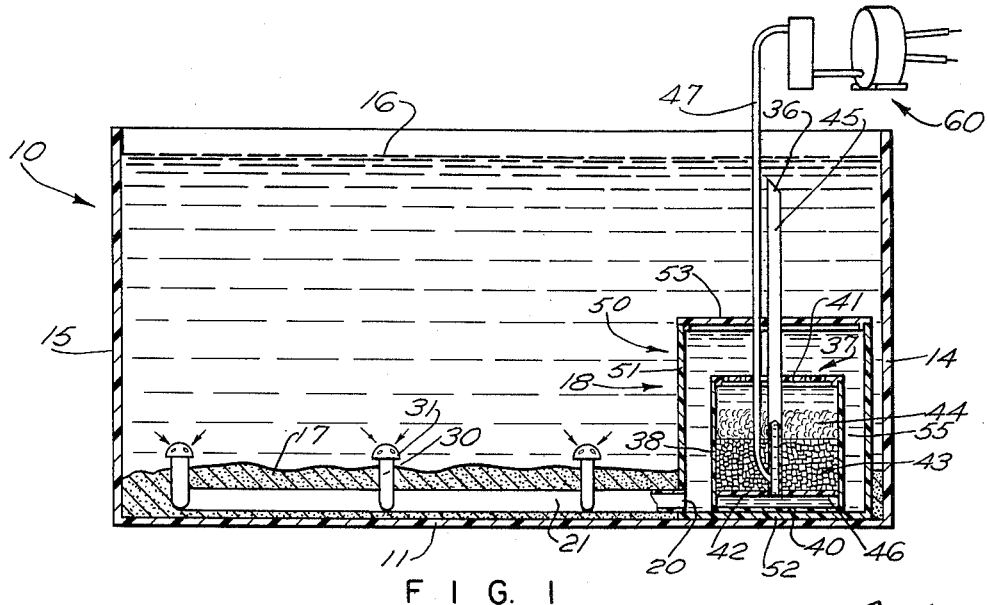
FIG. 1 is a sectional view through the aquarium and my filter.
Figure 2:
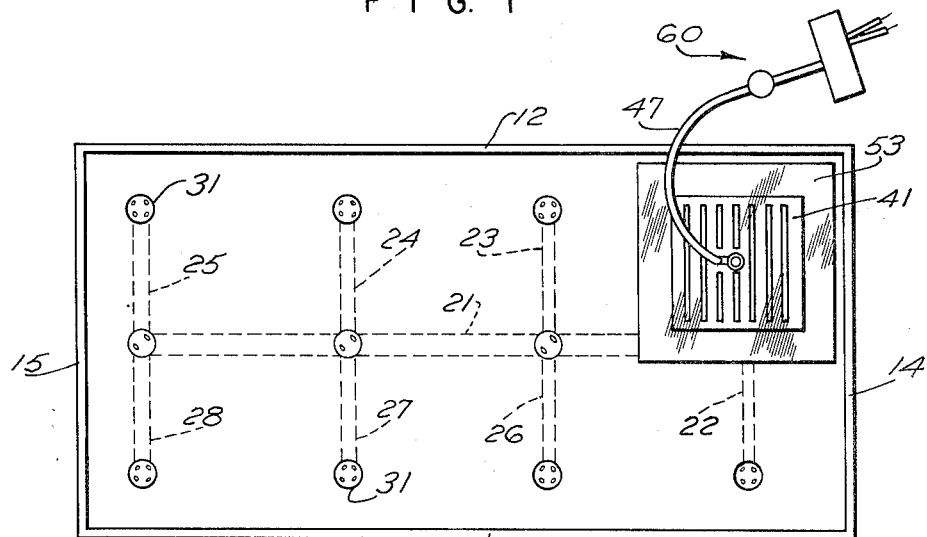
FIG. 2 is a top plan view of the aquarium showing my filter therein.

In proceeding with this invention, I provide a filter with inlet and discharge openings and a filtering medium between and connected to the inlet opening there is a conduit which has branches which are spread over a substantial area of the aquarium so that a pick-up may be had from all areas of the aquarium, while from the discharge opening from the filter. I provide some means by which the water may be drawn into the filter and passed therethrough.

With reference to the drawings, 10 designates generally an aquarium having a bottom wall 11, opposite side walls 12 and 13 and end walls 14 and 15. Water is shown in the aquarium to the level 16 while there is sand or some ornamental material in the lower part of the aquarium on the bottom wall 11 and which is designated 17. A filter designated generally 18 is located near the end wall 14 and near the back wall of the aquarium and is partly submerged in the sand 17. This filter has a conduit 21 to the inlet opening 20 of the filter and from this a center conduit 21 there are branch conduits 22, 23, 24, 25, 26, 27 and 28 connected to the center conduit and which conduits are located beneath the gravel or sand 17 in the bottom of the aquarium with tubes 30 extending upwardly from these conduits, both the center conduit and the branch conduits, with pick-up devices 31 located above the gravel or sand 17 thus providing a large number of pick-up points over the lower portion of the aquarium for gathering liquid to be transmitted to the filter without the liquid passing through the gravel or sand 17.

Figures 3, 5:
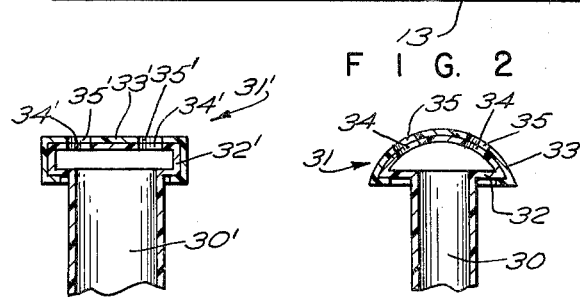
FIG. 3 is an enlarged section of a pick-up device.
FIG. 5 is a view similar to FIG. 3 of a modified form thereof.
Figure 4:
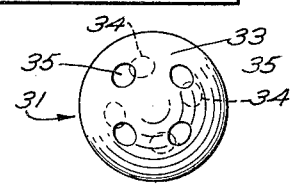
FIG. 4 is a top plan view of FIG. 3.

The pick-up device of FIG. 3 comprises a head 32 at the end of the tube 30 with openings 34 therein and a rotatable cap 33 with registering openings 35 therein. The openings when in registry permit of maximum entrance of liquid into the conduit but this may be reduced or even closed entirely by a relative rotation of the cap 33 on the head 32. The showing in FIG. 5 is substantially the same but of different shape, the corresponding parts being designated by the same reference numeral with a prime added.

The conduits to the filter are of graduated sizes on the principle that larger inner diameter conduits will be the greater distance from the filter and the smaller inner diameter will be nearer the filter with a progressive relation between this conduit 22 may be for illustration ⅜ of an inch inside diameter conduits 23 and 26 will be ½ of an inch inside diameter, conduits 24 and 27 will be ⅝ of an inch inside diameter and conduits 25 and 28 will be ¾ of an inch inside diameter. The center conduit 21 will be one inch inside diameter also the head and cap to the center tube will have two holes instead of four as in the caps to the smaller diameter conduits.

The filter comprises essentially a compartment having an inlet opening 20 and a discharge opening 36 with a filtering medium between these openings. The arrangement comprises an inner compartment 37 having imperforate side and end walls 38 and an imperforate bottom wall 40 and a perforate top wall 41. A false bottom also perforate is shown at 42 and between these perforate walls 41 and 42 there is located the filtering medium which comprises charcoal 43 and glass wool or fibers 44. A discharge tube 45 extends upwardly from the area 46 beneath the false bottom 42 while air under pressure may be forced inwardly through the tube 47 from the air pump 60 to the tube 45 so that circulation of liquid through the filter may be had.

An outer compartment 50 embraces the compartment 37. This outer compartment has four closed sides 51 and a bottom 52 which is closed except for the entrance of the conduit 21 thereto at the inlet opening 20 together with a top wall 53 which is closed except for the passage of the tubes 45 and 47 through the top wall which are in sealed relation therewith. This outer compartment 50 is substantially larger than the inner compartment 37, thus providing passageways 55 about the inner compartment or between the two compartments. By this arrangement, water may enter the outer compartment at the inlet opening 20 move along the passageways 55 between the compartments and enter the filter through the perforated top wall 41, passing down through the filter medium to the space 46 and then upwardly through the tube 45 to again enter the aquarium at 36.

The air which enters through the tube 47 is supplied by a small electric motor driving an air pump which assembly is designated as 60.

By the above arrangement, it will be apparent that I provide for circulation of the water in an aquarium through a filter by picking up the water from a various number of locations piping it to the filter and discharging it; thus, the water all over the aquarium is picked up and circulated through the filter while passing back to its area from which it is picked up in a clean condition.

I claim:

1. In an aquarium having a gravel bed, a filter having its uppermost portion below the liquid surface level thereof comprising one compartment within another with a passage between, an inlet from the aquarium to the outer compartment and a discharge opening to the aquarium from the inner compartment and an inlet thereto from said passage, a filter medium in said inner compartment between said inlet thereto and said discharge opening therefrom and a conduit to said outer compartment from said aquarium, said conduit including branch conduits connected therewith having vertical portions provided with pick-up devices positioned above a gravel bed for receiving water from different parts of the aquarium.

2. In an aquarium, a filter having its uppermost portion below the liquid level surface thereof comprising one compartment within another with an inlet passage from the aquarium to the outer compartment, said inner compartment having an imperforate bottom wall and side walls with an inlet opening thereto at its upper portion from the outer compartment, a perforate partition above said bottom wall, filter material above said partition for down flow therethrough and a discharge tube having an inlet opening above said bottom wall and extending through said partition and said outer compartment to the aquarium for up flow therethrough, said inner compartment being removable from the outer compartment through the top of said outer compartment, whereby the liquid and debris in the inner compartment is maintained therein during removal for cleaning.

3. In an aquarium having a gravel bed on its bottom, a plurality of branch conduits beneath the gravel bed extending generally to all areas of the gravel bed within the aquarium and leading to a common conduit, means extending vertically from said branch conduits to a point above the gravel bed for pick-up of water from a variety of locations in said aquarium, a filter medium within a compartment, means providing a chamber removably communicating said filter medium and said branch conduits, whereby the filter medium and the compartment may be removed without disturbing the gravel bed and the conduits beneath it.

4. An aquarium as in claim 3 wherein said conduits are of progressively larger inside diameter as their distance from the filter increases.

References Cited by the Examiner

UNITED STATES PATENTS

| | | | |
|---|---|---|---|
| 1,248,169 | 9/1917 | Schnoor | 119—5 |
| 1,271,359 | 7/1918 | Price | 251—208 |
| 2,491,853 | 12/1949 | Feldman | 119—5 |
| 2,676,921 | 4/1954 | Vansteenkiste | 210—169 |
| 3,149,608 | 9/1964 | Murphy | 119—5 |

OTHER REFERENCES

German printed application No. 1,032,965, June 1958.

SAMUEL KOREN, *Primary Examiner.*

HUGH R. CHAMBLEE, *Examiner.*